United States Patent
Fisher et al.

(10) Patent No.: US 6,771,801 B1
(45) Date of Patent: Aug. 3, 2004

(54) ADAPTABLE PRE-DESIGNED PHOTOGRAPHIC STORYBOARD

(75) Inventors: Clay Harvey Fisher, Belmont, CA (US); Kurt Jonach, San Jose, CA (US); Neal Jacob Manowitz, Franklin Heights, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 611 days.

(21) Appl. No.: 09/632,571

(22) Filed: Aug. 4, 2000

Related U.S. Application Data (60) Provisional application No. 60/181,809, filed on Feb. 11, 2000.

(51) Int. Cl.[7] .............................. G06K 9/00; G06K 9/54
(52) U.S. Cl. .................... 382/112; 382/305; 707/104.1; 705/26; 348/231.2; 283/67
(58) Field of Search ................................ 382/112, 305, 382/309; 705/26, 27; 707/7, 104.1; 348/231.2; 283/67

(56) References Cited

U.S. PATENT DOCUMENTS

| | | | | |
|---|---|---|---|---|
| 5,477,264 A | * | 12/1995 | Sarbadhikari et al. | ... 348/231.6 |
| 6,035,323 A | * | 3/2000 | Narayen et al. | ............ 709/201 |
| 6,058,428 A | * | 5/2000 | Wang et al. | ................ 709/232 |
| 6,097,389 A | * | 8/2000 | Morris et al. | ................ 345/804 |
| 6,123,362 A | * | 9/2000 | Squilla et al. | ................ 283/67 |
| 6,169,544 B1 | * | 1/2001 | Onoda | ........................ 345/723 |
| 6,202,061 B1 | * | 3/2001 | Khosla et al. | ................. 707/3 |
| 6,222,947 B1 | * | 4/2001 | Koba | .......................... 382/284 |
| 6,282,330 B1 | * | 8/2001 | Yokota et al. | .............. 382/309 |
| 6,301,586 B1 | * | 10/2001 | Yang et al. | .............. 707/104.1 |
| 6,313,835 B1 | * | 11/2001 | Gever et al. | ................. 345/846 |
| 6,324,545 B1 | * | 11/2001 | Morag | ........................ 707/202 |
| 6,358,341 B1 | * | 3/2002 | Bergquist | .................... 156/63 |
| 6,396,963 B2 | * | 5/2002 | Shaffer et al. | .............. 382/305 |
| 6,434,579 B1 | * | 8/2002 | Shaffer et al. | .............. 715/520 |
| 6,469,711 B2 | | 10/2002 | Foreman et al. | |
| 6,512,570 B2 | * | 1/2003 | Garfinkle et al. | ............. 355/40 |
| 6,522,418 B2 | * | 2/2003 | Yokomizo et al. | ......... 358/1.15 |
| 6,573,927 B2 | * | 6/2003 | Parulski et al. | ............... 348/32 |
| 6,636,648 B2 | * | 10/2003 | Loui et al. | .................. 382/284 |
| 2003/0093493 A1 | * | 5/2003 | Watanabe et al. | ........... 709/217 |

OTHER PUBLICATIONS

Yagawa et al. "The Digital Album: A Personal File–tainment System." IEEE Proceedings of Multimedia '96. pp. 433–439.*

* cited by examiner

*Primary Examiner*—Bhavesh M. Mehta
*Assistant Examiner*—Aaron Carter
(74) *Attorney, Agent, or Firm*—Blakely, Sokoloff, Taylor & Zafman LLP (57) ABSTRACT

A photograph album system dynamically rearranges a template for a photograph album based on images supplied by a user. The photograph album system also allows the user to edit an existing album template and can create a new template from a completed photograph album. When the photograph album system is an online web site, the system may require compensation for the user's activity on the web site.

30 Claims, 6 Drawing Sheets

ADAPTABLE PRE-DESIGNED PHOTOGRAPHIC STORYBOARD

RELATED APPLICATIONS

This application claims the benefit of U.S. Provisional Application No. 60/181,809, filed Feb. 11, 2000.

FIELD OF THE INVENTION

This invention relates generally to computerized photograph albums, and more particularly to creating a computerized photograph album based on a sequence of digital images.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Sony Electronic, Inc., All Rights Reserved.

BACKGROUND OF THE INVENTION

Digital photograph album software allows a computer user to arrange digital images, such as photographs, into computerized albums. Additionally, Internet users can upload digital images to various web sites to create online photograph albums that they, their family and friends, or the general public can enjoy. To facilitate the creation of the photograph album, the user relies on pre-written electronic templates. The templates are frequently in the form of a storyboard containing a series of images that indicate the subject matter of the images that should appear in the photograph album. The number of pages in the photograph album may also be fixed. However, the user is typically provided little or no template editing capability. Therefore, the user that has more images, different images, or is missing one or more images must adapt the images to match the template instead of having the template adjust to match the images available.

SUMMARY OF THE INVENTION

A photograph album system dynamically creates a computerized photograph album from a set of digital images. The photograph album is based on a pre-designed template that contains a series of scenes. The system obtains the set of digital images, such as photographs, from a user. Each image is associated with one of the scenes in the template. The system automatically modifies the template to correspond to available images before arranging the images in the template to create the photograph album. The photograph album system can save the modified template as a new photograph template and also allows the user to modify the template prior to supplying the images. In another aspect of the invention, each scene in the template has been assigned a number of photo slots, which are adjusted to match the number of images associated with the scene. Additionally, a user may be required to compensate the owner of an online photograph album web site for an album.

The photograph album system allows the user to start with a basic album template, perhaps created by a professional, and adapt that template to the particular images the user has, thus creating a personalized album. It also enables the user to modify and reuse a template directed to a special event as a guide for photographing such an event.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1A:
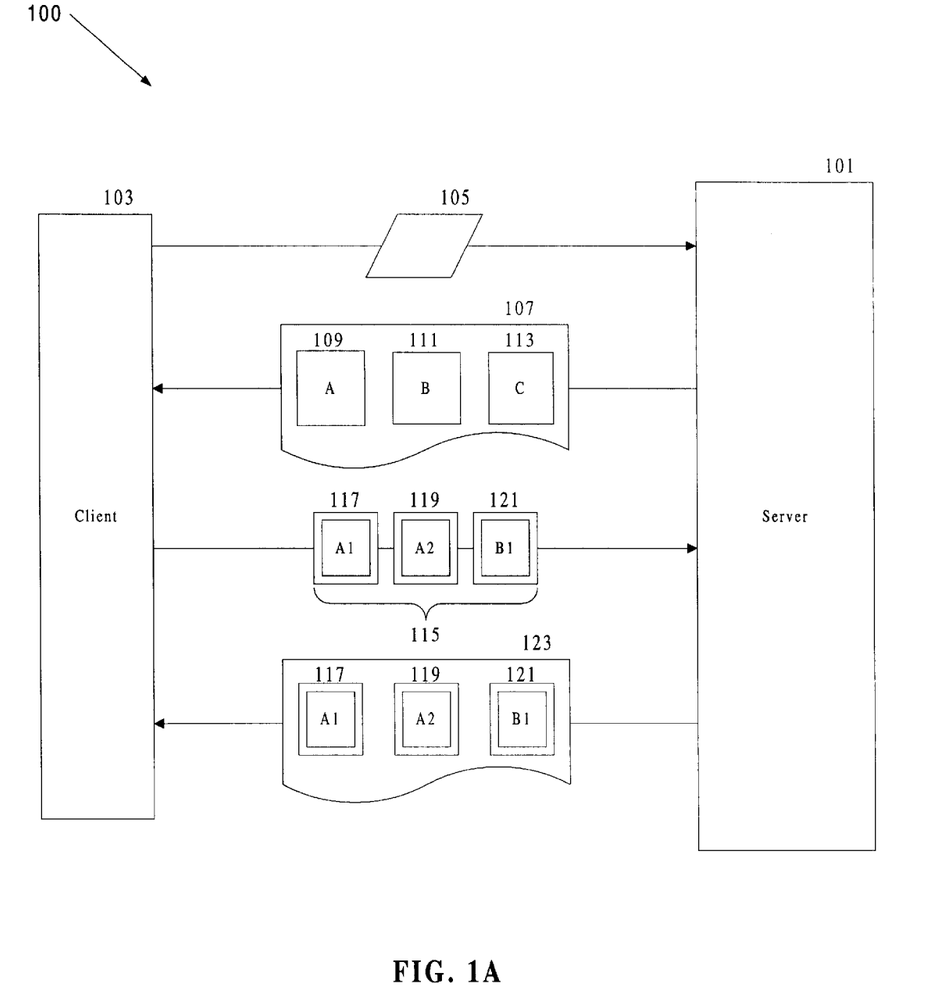
FIG. 1A is a diagram illustrating an overview of the operation of an embodiment of a networked photograph album system according to the invention.

Beginning with an overview of the operation of the invention, FIG. 1A illustrates one embodiment of a networked photograph album system 100 having a photograph album server 101 that creates photograph albums from a set of images supplied from a client computer 103 by a user. The images may be photographs, digitized pictures, clip art, video clips, or other types of digital images. The client computer 103 sends a message 105 to the server computer 101 requesting the creation of a new photograph album. In response, the server 101 displays an album template 107 in the form of a series of scenes, scene A 109, scene B 111 and scene C 113. The scenes are arranged in the template 107 in a pre-defined format. In FIG. 1A, the template format is a conventional storyboard in which scenes appear in chronological order from left-to-right and top-to-bottom. Each scene in the template serves as a placeholder for one or more images that will illustrate the scene in the finished album.

In response to receiving the template 107, the user supplies a set of images 115 for the album consisting of image A1 117, A2 119, and B1 121. Images A1 117 and A2 119 correspond to the scene A 109 in the template 107 and form one subset of the set 115. Image B1 121 corresponds to the scene B 111 and forms another subset of the set 115. The user does not have an image that corresponds to scene C 113. Upon receipt of the set of images 115, the server 101 dynamically rearranges the format of the album to account for the fact that the subset for scene A 109 contains two images and there is no subset of images for scene C 113. The server 101 creates two photo slots in the album for scene A 109, followed by a photo slot for scene B 111 and arranges the user's images in the corresponding slots. Therefore, when the completed album 123 is displayed on the client computer 103, it shows images A1 117, A2 119 and then image B1 121 as a chronological storyboard.

Figure 1B:
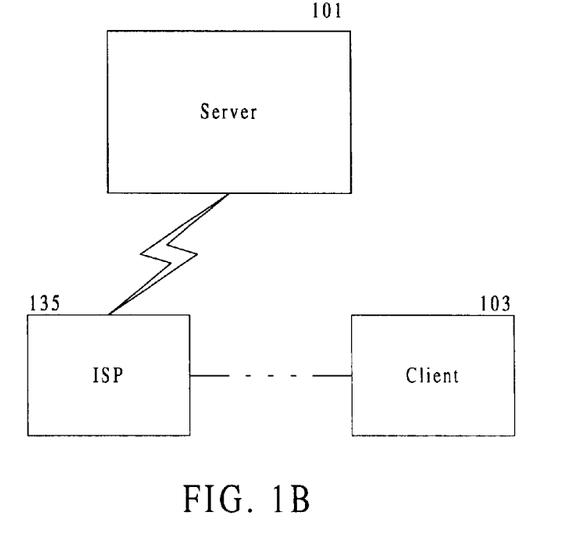
FIGS. 1B and 1C are diagrams of a computer environment suitable for practicing the invention.

In one embodiment, as shown in FIG. 1B, the photograph album server 101 hosts a photograph album web site and is part of, or coupled to, an ISP (Internet Service Provider) 135 to provide online photograph albums over the Internet. The client computer 103 executes a conventional Internet browsing application to exchange data with the server 101. It is readily apparent that the present invention is not limited to Internet access and Internet web-based sites; directly coupled and private networks are also contemplated.

Figure 1C:
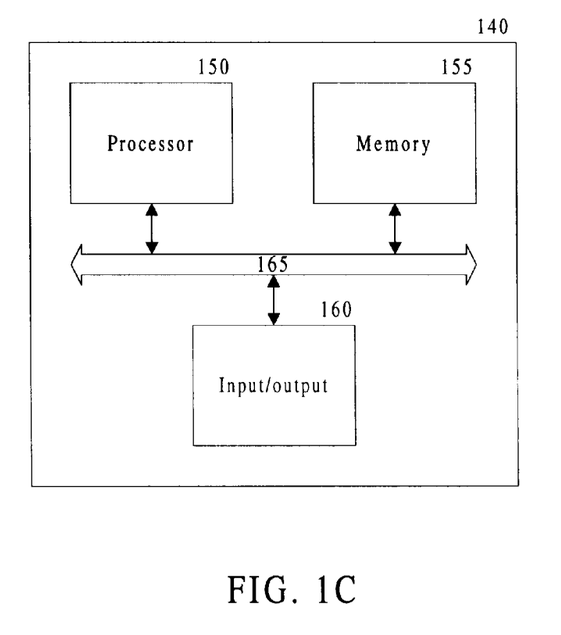

One embodiment of a computer system suitable for use as the photograph album server 101 is illustrated in FIG. 1C. The computer system 140, includes a processor 150, memory 155 and input/output capability 160 coupled to a system bus 165. The memory 155 is configured to store instructions which, when executed by the processor 150, perform the methods described herein. The memory 155 may also store content for the storyboards, images, and photograph albums. Input/output 160 provides for the delivery and display of the content of the photograph albums or portions or representations thereof. Input/output 160 also encompasses various types of computer-readable media, including any type of storage device that is accessible by the processor 150. One of skill in the art will immediately recognize that the term "computer-readable medium/media" further encompasses a carrier wave that encodes a data signal. It will also be appreciated that the server 101 is controlled by operating system software executing in memory 155. Input/output and related media 160 store the computer-executable instructions for the operating system and methods of the present invention as well as the content for the photograph albums.

The description of FIGS. 1B–C is intended to provide an overview of computer hardware and other operating components suitable for implementing the invention, but is not intended to limit the applicable environments. It will be appreciated that the computer system 140 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Figure 2:
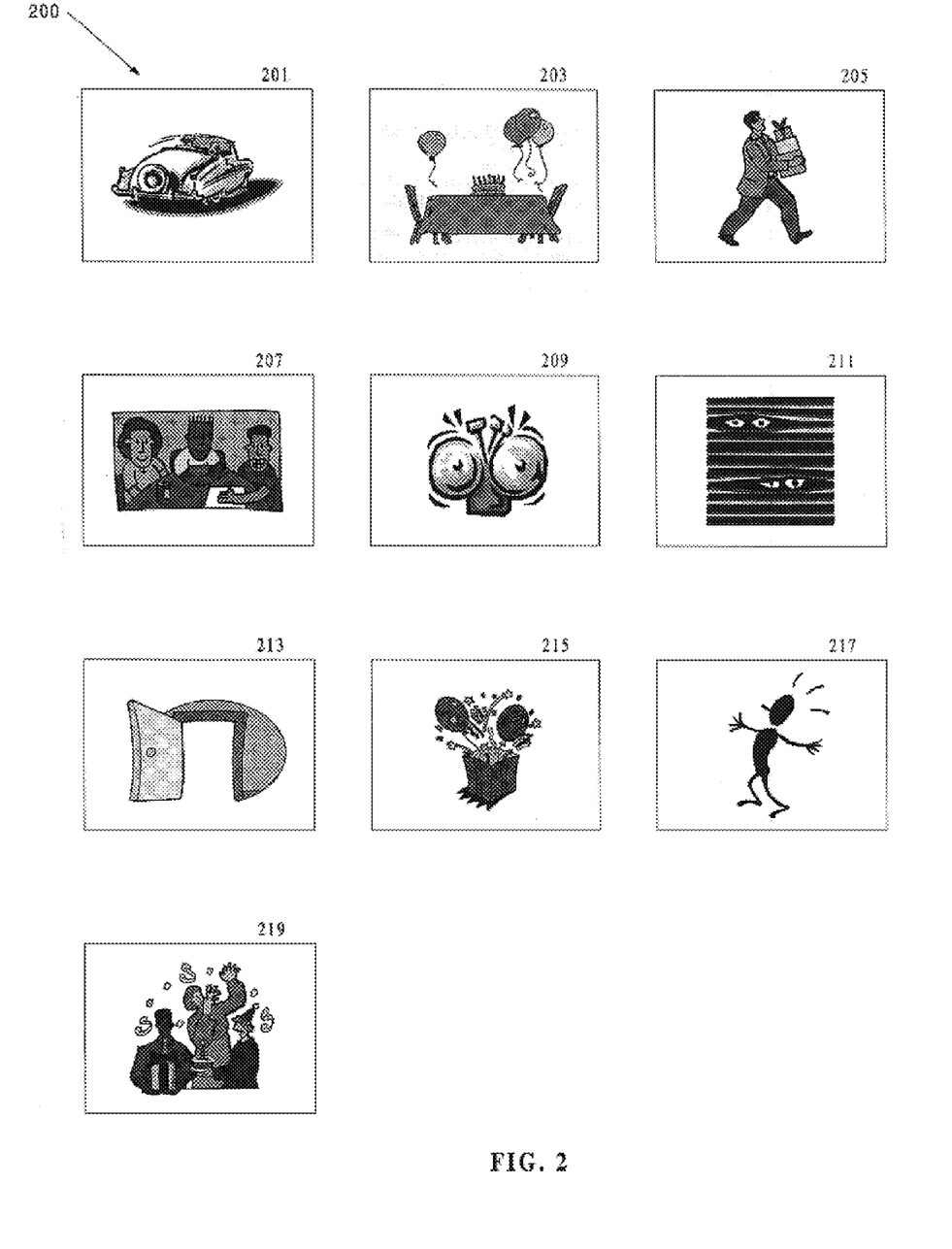
FIG. 2 is an example of a networked photograph album template used in conjunction with FIG. 1A.
Figure 3:
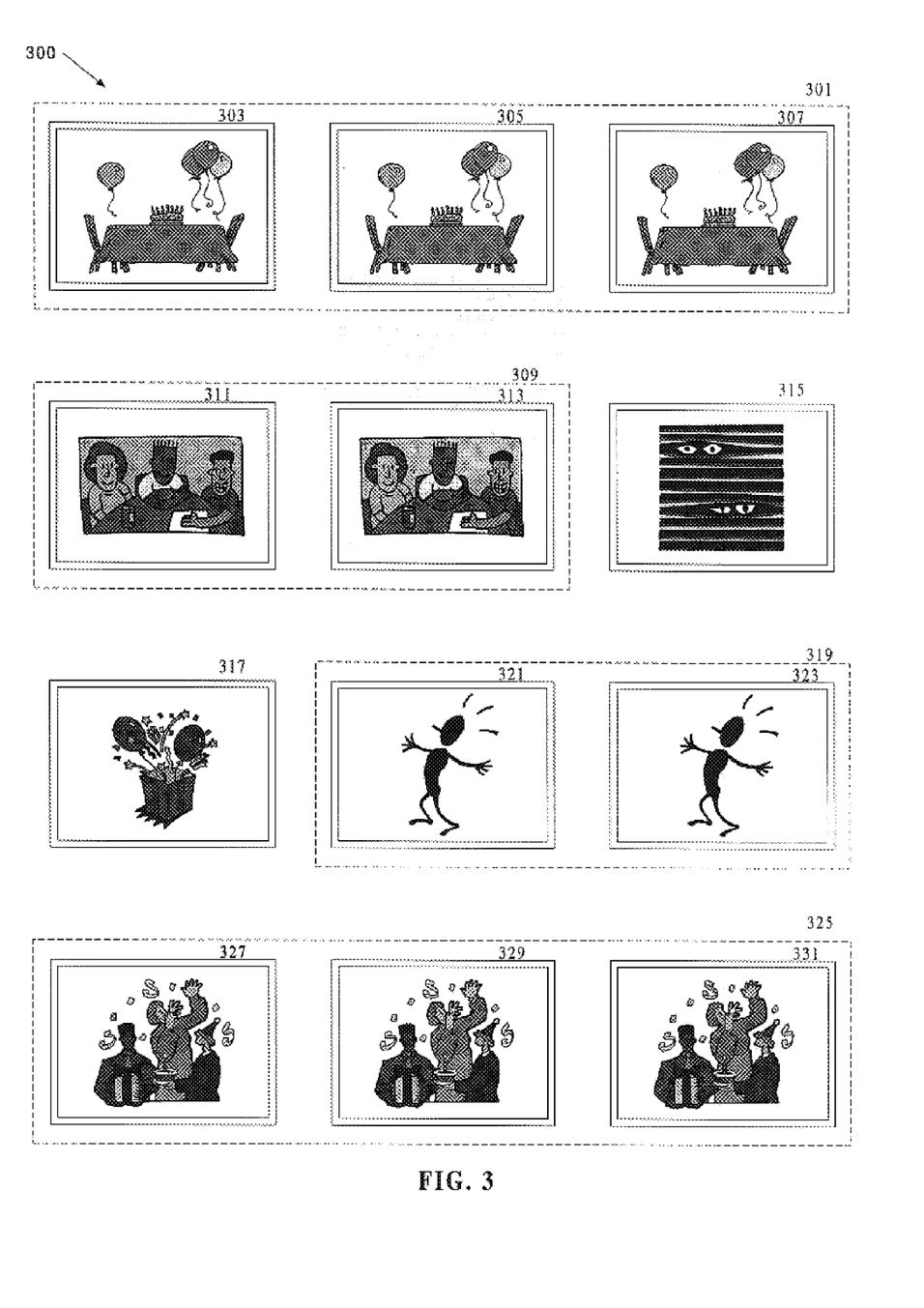
FIG. 3 is an example of a photograph album created using the template of FIG. 2.

An example of the dynamic rearrangement of a networked photograph album is shown next with reference to FIGS. 2 and 3. FIG. 2 shows album template 200 for a surprise birthday party as a storyboard. Scene 201 is a placeholder for one or more images of the birthday person leaving the location where the surprise party will be held. Scene 203 is a placeholder for images of decorating the party location. Scenes 205 and 207 are placeholders for images of the guests arriving and waiting for the return the birthday person respectively. Scene 209 is a placeholder for images of the person acting as a lookout telling the guests that the birthday person has returned. Scene 211 is a placeholder for images of the guests hiding. Scenes 213 and 215 are placeholders for images of the door opening and the guests yelling "Surprise!". Scene 217 is a placeholder for images of the surprised birthday person. Finally scene 219 is a placeholder for images of the birthday party celebration.

FIG. 3 shows a photograph album 300 created from the surprise birthday party album template 200. In this example, the user supplies photographs to create the photograph album 300 but it will be readily appreciated that other types of digital images, such as video clips, digitized pictures and clip art, or a combination of different types of digital images can be used to fill the album. The user supplies three photographs of the party location being decorated (scene 203), two photographs of the guests enjoying themselves prior to the arrival of the birthday party person (scene 207), one photograph of the guests hiding (scene 211), one photograph of the guests yelling "Surprise!" (scene 215), two photographs of the reaction of the birthday person (scene 217), and three photographs of the birthday party (scene 219). In response to the photographs supplied by the user, the photograph album server 101 creates three photo slots 303, 305 307 (collectively slots 301) for scene 203, two slots 311, 313 (collectively slots 309) for scene 207, one slot 317 for scene 215, two slots 321, 323 (collectively slots 319) for scene 217 and three slots 327, 329, 331 (collectively slots 325) for scene 219. The appropriate photographs are arranged in the slots and the photograph album 300 displayed to the user.

Although not illustrated, the photograph album server 101 allows the user to rearrange the order of the scenes in the template and therefore rearrange the sequence of the images as they appear in the finished album in FIG. 3. In one embodiment, the user "drags and drops" the scenes from one location in the template to another. The user can also delete or add scenes, if desired, such as commonly performed by right clicking a mouse button and choosing from a context-sensitive menu.

Thus, the photograph album system automatically adjust the template to match the available images and also allows the user to create a new template from a finished photograph album or by editing a pre-existing template. While shown as a single page in FIGS. 2 and 3 for sake of clarity, the invention is not so limited. For example, a photograph album template and corresponding finished photograph album may be multiple pages, and the photograph album server adjusts the number of pages to accommodate the number of images supplied, or as required by user edits.

In an alternate embodiment, the owner of the server requires compensation when an online photograph album is created. The server may request a payment from the user when the user indicates that he/she wants to create an album or the user may subscribe to a plan that allows a certain number of albums to be created for a single fee. It will be appreciated that other compensation schemes can be implemented on the server without exceeding the scope of the invention.

Additionally, one of skill in the art will immediately understand that the invention can be practiced on a user computer as well as a networked server. In such an embodiment, the user supplies the digital images to the computer through such conventional means as floppy disk, CD-ROM or scanner, the computer performs the processing previously described for the server, and the finished photograph album is stored on computer-readable media for subsequent display or distribution.

Figure 4A:
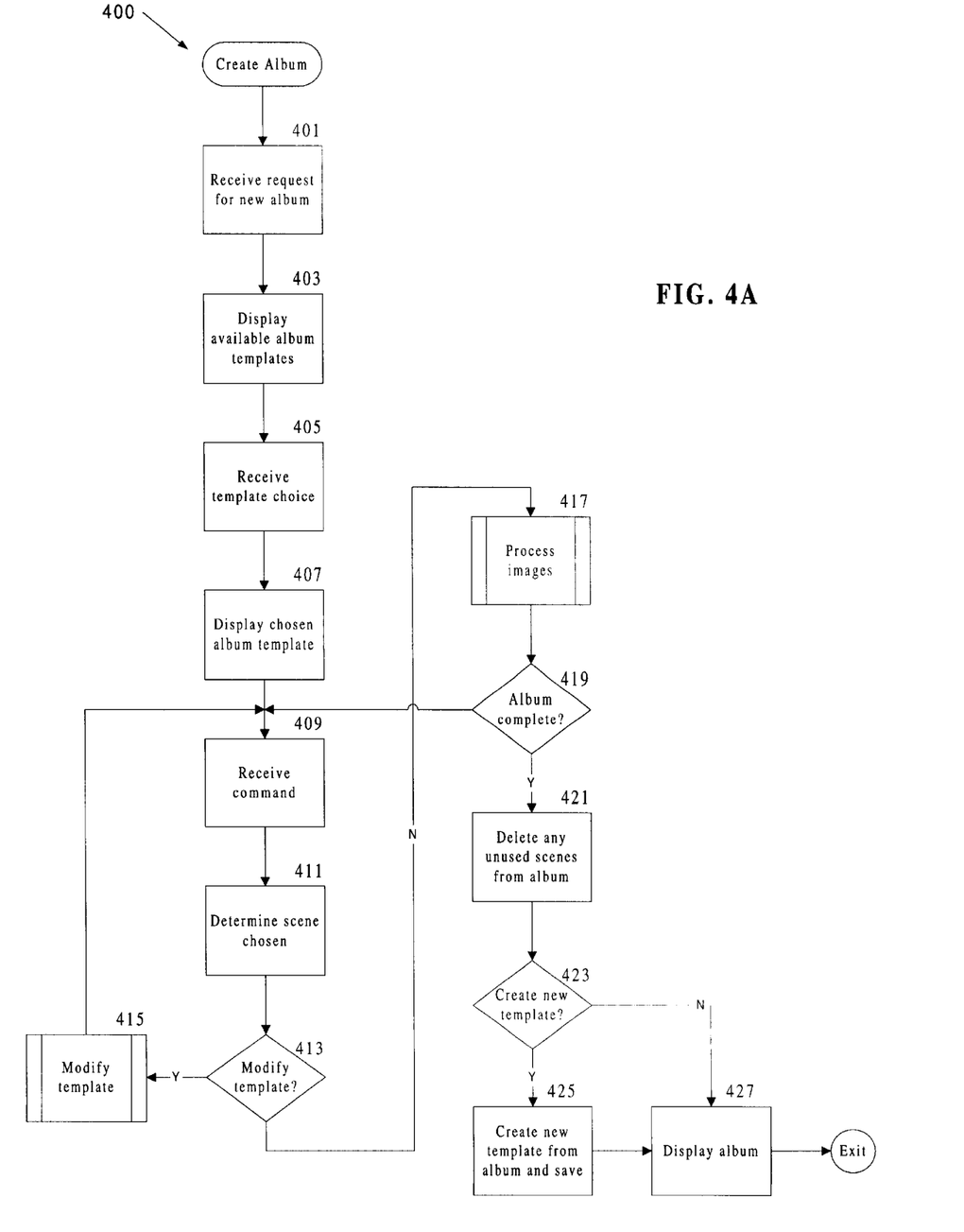
FIGS. 4A–C are flowcharts of methods to be performed by a computer to create a photograph album according to an embodiment of the invention.
Figure 4B:
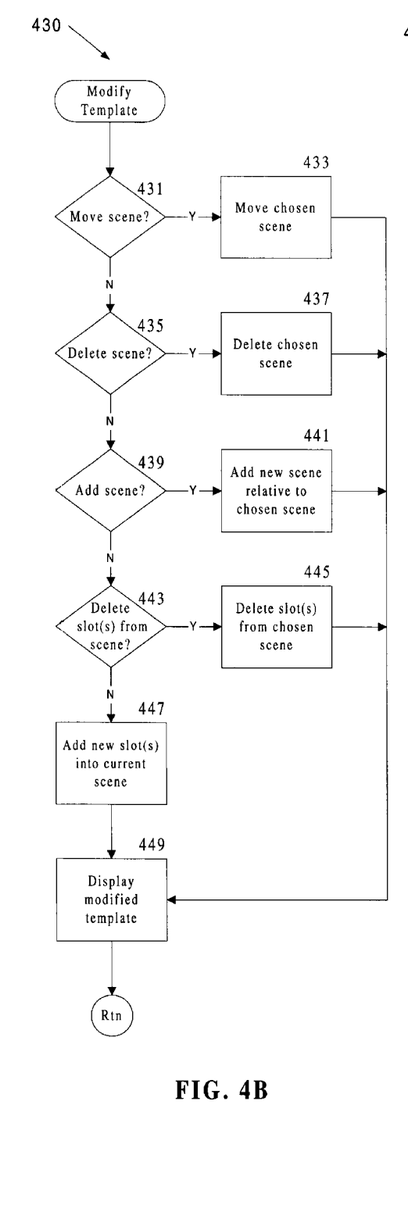
Figure 4C:
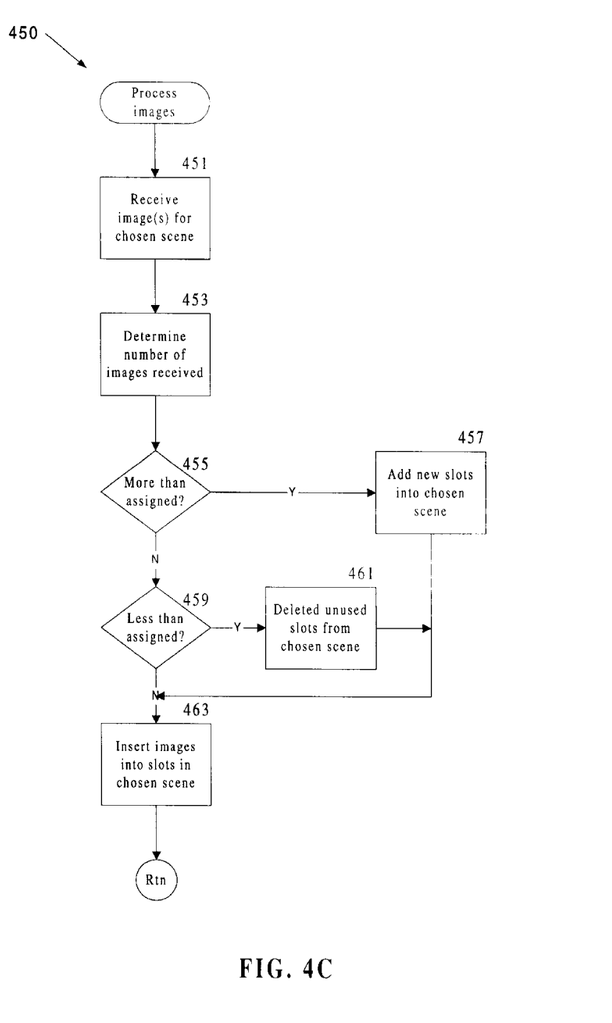

Next, the particular methods of the invention are described in terms of computer software with reference to a series of flowcharts. FIGS. 4A–C illustrate one embodiment of a create album method 400 and supporting methods executed by a computer, such as the server 101 of FIG. 1A or a user computer, when creating a photograph album such as shown in FIG. 3. The methods constitute computer programs made up of computer-executable instructions illustrated as blocks (acts) 401 until 427 in FIG. 4A, 431 until 449 in FIG. 4B, and 451 until 463 in FIG. 4C. Describing the methods by reference to flowcharts enables one skilled in the art to develop programs including instructions to carry out the methods on a suitable computer (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

The method 400 begins by receiving a request for new album from the user (block 401). In response, the create album method 400 displays a list of available album templates to the user (block 403). The user makes a choice of templates. In response to receiving the choice at block 405, the server displays the chosen album template to the user (block 407). At this point, the user chooses a scene and indicates that the template is to be modified or that images will be supplied for that scene.

The create album method 400 determines which scene has been chosen by the user (block 411) and whether the command is to modify the template (block 413). If so, the method 400 performs a modify template method at block 415 as described in more detail later in conjunction with FIG. 4B. Once the process represented by block 415 is performed, the method 400 loops back to receive another command at block 409.

If the command is not a modify template command (block 413), the create album method 400 processes images are being supplied by the user (block 417). The processing of the images is described further below in conjunction with FIG. 4C. Once the album is complete (block 419), the create album method 400 deletes any unused scenes from the album (block 421). It will be apparent that the processing at block 421 may not be necessary if the user has previously modified the template prior to supplying the images.

In an alternate embodiment in which the owner of the server requires compensation (not illustrated), the server can request payment at various points in the process. Additionally, the payment amount may vary depending on which template is chosen, how many images are received, whether a new template is created, etc. The server will wait until it has received confirmation of payment (through conventional means such as validating a credit card number, etc.) before proceeding onto the next act in the process.

In the embodiment shown in FIG. 4A, the create album method 400 also determines whether the user would like to create a new template based on the album as it is currently arranged (block 423). If the user so desires, the method 400 creates the new template with those scenes that are present in the finished album and saves the template with a new name (block 425). The method 400 concludes by displaying the finished album to the user at block 427 before exiting.

Turning now to FIG. 4B, one embodiment of a modify template method 430 is described. The modify template method 430 determines what type of modification the user wants. If the user wants to move a scene (block 431), the method 430 moves the scene to a new location in the template indicated by the user (block 433). It will be appreciated that the new location of the scene can be determined in a drag-and-drop operation when the user choose the scene with a mouse button and then releases the button to drops the chosen scene into its new location. If the scene is to deleted (block 435), the method 430 deletes the chosen scene from the template (block 437) and rearranges the remaining scenes. If a scene is to be added (block 439), the modify template method 430 adds the new scene relative, e.g., before or after, to the chosen scene (block 441).

In the embodiment of the modify template method 430 shown in FIG. 4B, each scene in the template is assigned a default number of photo slots which the user is allowed to increase or decrease. For example, in the template 200, the default is one and each scene is assigned a one photo slot. The modify template method 430 determines if the user wishes to delete or add one or more slots in the chosen scene (block 443). If so, the method 430 deletes slots (block 445) or adds new slots (block 447) to the scene appropriately. The modify template method 430 has processed the modification command, it displays the modified template to the user at block 449 and returns to the create album method 400.

FIG. 4C illustrates one embodiment of a method that processes the images supplied by the user for the photograph album. The process images method 450 receives one or more images for a chosen scene from the user at block 451. The method 450 determines the number of images received (block 453) and determines whether there are more or less images than the number of slots assigned for the scene in the template. If there are more images than assigned (block 455) then the process image method 450 adds the appropriate number of new slots into the chosen scene to accommodate the additional images (block 457). If there are less images than assigned (block 459), the process image method 450 deletes the number of unused slots from the chosen scene (block 461). Once the adjustment are made to the number of slots required by the available images for the chosen scene, or if there is no adjustment necessary, the method 450 inserts the images into the photo slots (block 463) and returns to create album method 400.

A photograph album system has been described that dynamically rearranges a template for a photograph album based on images supplied by a user by increasing or decreasing the number of photo slots in each scene and deleting scenes for which there are no corresponding images. Additionally, the photograph album system can create a new template from a completed photograph album upon request. Furthermore, a user of the photograph album system of the present invention can edit an existing album template to meet his/her needs before supplying the images.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to network architecture is meant to include all client-server environments. Therefore, it is manifestly intended that this invention be limited only by the following claims and equivalents thereof.

What is claimed is:

1. A computerized method for dynamically creating a photograph album from a set of digital images comprising:

obtaining the set of digital images from a user, each image associated with a scene in a photograph album template, the photograph album template comprising a series of scenes and each scene serving as a placeholder for at least one digital image illustrating subject matter of the scene and further comprising an assigned number of photo slots;

determining a number of the digital images associated with each scene;

automatically adjusting the number of photo slots for each scene if the number of digital images associated with the scene is different than the assigned number; and arranging the digital images in the photo slots in the photograph album template.

2. The computerized method of claim 1, further comprising:

deleting a scene from the photograph album template if no digital image is associated with the scene.

3. The computerized method of claim 1, wherein obtaining the set of digital images comprises:

receiving the set of digital images as a plurality of subsets, each subset comprising the digital images associated with one of the plurality of scenes; and identifying the scene associated with each subset.

4. The computerized method of claim 1 further comprising:

identifying the photograph album template from a plurality of photograph album templates.

5. The computerized method of claim 1 further comprising:

creating a new photograph album template based on the photograph album template as modified.

6. The computerized method of claim 1 further comprising:

modifying the photograph album template in response to a command from the user.

7. The computerized method of claim 1, wherein the photograph album template comprises a series of scenes formatted as a storyboard.

8. The computerized method of claim 1, wherein the user uploads the digital images to a web site to create an online photograph album.

9. The computerized method of claim 8 further comprising:

requesting an amount of compensation from the user for activity on the web site and receiving the amount of compensation from the user.

10. A computer-readable medium having computer-executable instructions to a cause a computer to perform a method comprising:

identifying a photograph album template from a plurality of photograph album templates, the photograph album template comprising a plurality of scenes and each scene serving as a placeholder for at least one digital image illustrating subject matter of the scene and further comprising an assigned number of photo slots;

obtaining a set of digital images from a user, each image associated with a scene;

determining a number of the digital images associated with each scene;

automatically adjusting the number of photo slots for each scene if the number of digital images associated with the scene is different than the assigned number; and arranging the digital images in the photo slots in the photograph album template to create an image album.

11. The computer-readable medium of claim 10 having further computer-executable instructions comprising:

modifying the photograph album template in response to a command from the user.

12. The computer-readable medium of claim 10, wherein the computer is a web site server and the photograph album is viewable online from the server.

13. The computer-readable medium of claim 12 having further computer-executable instructions comprising:

requesting an amount of compensation from the user for activity on the web site and receiving the amount of compensation from the user.

14. The computer-readable medium of claim 10, wherein the computer is a stand-alone computer and the photograph album is viewable on the stand-alone computer.

15. A computerized system comprising:

a processor;

a memory coupled to the processor through a system bus;

a computer-readable medium coupled to the processor through the system bus;

a photograph album template stored on the computer-readable medium; and a photograph album creation process executed from the computer-readable medium by the processor to cause the processor to obtain a set of digital images and to automatically modify an assigned number of photo slots for a scene of the photograph album template to correspond to the set of digital images to create the photograph album, the scene serving as a placeholder for at least one digital image illustrating subject matter of the scene.

16. The computerized system of claim 15, wherein the photograph album creation process further causes the processor to save the modified photograph album template as a new photograph album template.

17. The computerized system of claim 15, further comprising an input coupled to the processor through the system bus, wherein the photograph album creation process further causes the processor to modify the photograph album template in response to a command received through the input.

18. The computerized system of claim 17, wherein the system is a web site server and the input is an Internet connection to a user.

19. The computerized system of claim 18, wherein the photograph album creation process obtains the set of digital images through the Internet connection to the user.

20. The computerized system of claim 18, wherein the photograph album creation process causes the process to request compensation from the user.

21. The computerized system of claim 17, wherein the system is a stand-alone computer and the input is a user input device.

22. The computerized system of claim 21, wherein the photograph album creation process obtains the set of the digital images as directed by a command received through the user input device.

23. A system for dynamically creating a photograph album from a pre-designed photograph album template comprising:

means for obtaining a set of digital images associated with scenes in the pre-designed photograph album template, each scene serving as a placeholder for at least one digital image illustrating subject matter of the scene;

means for automatically modifying an assigned number of photo slots for each scene in the pre-designed photograph album template; and means for arranging the set of digital images in accordance with the modified pre-designed photograph album template.

24. The system of claim 23, wherein the means for modifying further comprises: means for receiving user commands that specify changes to the pre-designed photograph album template.

25. The system of claim 24, wherein the means for modifying changes the pre-designed photograph album template to correspond to the set of digital images.

26. A method for receiving compensation for use of an online photograph album server by a user comprising:

determining an amount of compensation based on activity on the online photograph album server by the user, the activity comprising creating an online photograph album, wherein an assigned number of photo slots for a scene of a photograph album template is automatically modified, the scene serving as a placeholder for at least one digital image illustrating subject matter of the scene;

requesting the amount of compensation from the user; and receiving the amount of compensation.

27. The method of claim 26, wherein the activity on the online photograph album server further comprises one or more of receiving a request to create an online photograph album, receiving a request for a particular online photograph album template, receiving one or more images for the online photograph album, and receiving a request to create a new photograph album template.

28. The method of claim 26 further comprising:

disallowing activity on the online photograph album server by the user until the amount of compensation is received.

29. The method of claim 26 further comprising:

validating the amount of compensation received.

30. The method of claim 26, wherein determining the amount of compensation comprises:

determining if the user subscribes to a plan offered by the online photograph album server; and calculating the amount of compensation in accordance with terms of the plan.

\* \* \* \* \*